United States Patent [19]

Kimura

[11] 4,413,887
[45] Nov. 8, 1983

[54] ZOOM LENS SYSTEM
[75] Inventor: Tadashi Kimura, Tokyo, Japan
[73] Assignee: Olympus Optical Co., Ltd., Tokyo, Japan
[21] Appl. No.: 294,824
[22] Filed: Aug. 21, 1981
[30] Foreign Application Priority Data
Aug. 29, 1980 [JP] Japan ................ 55-119566
[51] Int. Cl.³ .............................................. G02B 15/16
[52] U.S. Cl. ................................................... 350/426
[58] Field of Search .......................................... 350/426
[56] References Cited
U.S. PATENT DOCUMENTS

| | | | |
|---|---|---|---|
| 4,142,779 | 3/1979 | Ogawa | 350/426 |
| 4,157,212 | 6/1979 | Ogawa | 350/426 |
| 4,169,660 | 10/1979 | Nakamura | 350/426 |
| 4,368,953 | 1/1983 | Kimura | 350/426 |

FOREIGN PATENT DOCUMENTS 2818966 11/1978 Fed. Rep. of Germany ...... 350/426

| | | | |
|---|---|---|---|
| 51-83543 | 7/1976 | Japan | 350/426 |
| 53-60246 | 5/1978 | Japan | 350/426 |
| 55-77712 | 6/1980 | Japan | 350/426 |

*Primary Examiner*—John K. Corbin
*Assistant Examiner*—Scott J. Sugarman
*Attorney, Agent, or Firm*—Cushman, Darby & Cushman

[57] ABSTRACT

A zoom lens system comprising a front lens group consisting of a first positive lens component, a second negative meniscus lens component having a convex surface on the image side, a third negative lens component and a fourth positive lens component, and a rear lens group consisting of a fifth positive lens component, a sixth positive lens component, a seventh negative lens component and a eighth positive lens component. The zoom lens system is so adapted as to perform zooming operation by varying the airspace reserved between the front and rear lens groups, and has sufficient wide-angle effect and a large zooming ratio in addition to aberrations corrected with good balance.

4 Claims, 28 Drawing Figures

SPHERICAL ABERRATION

ASTIGMATISM

DISTORTION

FIG. 4B

SPHERICAL ABERRATION

ASTIGMATISM

DISTORTION

FIG. 4C

SPHERICAL ABERRATION

ASTIGMATISM

DISTORTION

FIG. 6A

SPHERICAL ABERRATION

ASTIGMATISM

DISTORTION

FIG. 6B

SPHERICAL ABERRATION

ASTIGMATISM

DISTORTION

FIG. 6C

SPHERICAL ABERRATION

ASTIGMATISM

DISTORTION

FIG. 7A

SPHERICAL ABERRATION

ASTIGMATISM

DISTORTION

FIG. 7B

SPHERICAL ABERRATION

ASTIGMATISM

DISTORTION

FIG. 7C

SPHERICAL ABERRATION

ASTIGMATISM

DISTORTION

FIG. 8A

SPHERICAL ABERRATION

F/3.2

ASTIGMATISM 37.6°

DISTORTION 37.6°

FIG. 8B

SPHERICAL ABERRATION

F/3.6

ASTIGMATISM

30°

DISTORTION

SPHERICAL ABERRATION

F/4

ASTIGMATISM 24.2°

DISTORTION

SPHERICAL ABERRATION F/3.2

ASTIGMATISM 37.6°

DISTORTION 37.6°

FIG. 9B

SPHERICAL ABERRATION F/3.6

ASTIGMATISM 30°

DISTORTION 30°

FIG. 9C

SPHERICAL ABERRATION F/4

ASTIGMATISM 24.4°

DISTORTION 24.4°

ZOOM LENS SYSTEM

BACKGROUND OF THE INVENTION (a) Field of the invention

The present invention relates to a zoom lens system which is small, light in weight and has sufficient wide-angle effect as well as zooming effect.

(b) Description of the prior art

There has conventionally been known zoom lens systems having a simple composition consisting of a front lens group and a rear lens group, for example, those disclosed by Japanese Published Unexamined Patent Application No. 83543/76 and Japanese Published Unexamined Patent Application No. 60246/78. Out of these zoom lens systems, the former is designed for an aperture ratio of F/2.8 and a zooming ratio of 1.9 which assure sufficient brightness and zooming effect but cannot provide sufficient wide-angle effect due to a field angle of $2\omega = 64.6°$ at the wide angle position. The latter is designed for an aperture ratio of F/3.5, a zooming ratio of 1.67 to 1.85 and a field angle $2\omega = 52°$ to $54°$, but cannot provide sufficient wide-angle effect either.

SUMMARY OF THE INVENTION

A general object of the present invention is to provide a zoom lens system which has a simple composition consisting of two lens groups, is designed for half field angle effect in the wide angle position and a zooming ratio of 1.71 assuring sufficient zooming effect, has aberrations corrected with good balance, and provides sufficient quantity of offaxial marginal rays.

In a wide-angle zoom lens system, spherical aberration in the tele position, astigmatism in the wide angle position and variation of distortion pose problems when F number is kept constant during zooming operation, whereas astigmatism in the wide angle position, and spherical aberration as well as distortion in all positions from wide angle to tele position pose problems when F number is made variable to keep stop diameter constant. The zoom lens system according to the present invention is of the latter type which is so designed as not only to balance image plane optimum for spherical aberration with that for astigmatism in order to balance paraxial aberration with offaxial aberration but also match the image plane optimum for offaxial aberrations including coma with the image plane optimum for paraxial aberrations both at full aperture and small aperture in the stop-down condition. In contrast to the zoom lens systems such as those disclosed by the above-mentioned Japanese patent applications most of which adopt a front lens group consisting of three lens components, the zoom lens system according to the present invention uses an additional convex lens component in the front lens group in order to adequately adjust distortion which is apt to have too high a negative value in the front lens group so as to properly control variation of distortion relative to variation of field angle. Variations of distortion, astigmatism, chromatic aberration of magnification, chromatic aberration of coma, etc. relative to variation of field angle are controlled to munimum levels respectively in the front lens group, and absolute values of spherical aberration and other aberrations are controlled to adequate levels in the rear lens group.

Furhter, the zoom lens system according to the present invention has a constant stop aperture as is described above. In the zoom lens system of this type, height of incidence into the rear lens group in the tele position is nearly equal to that in the wide angle position but height of incidence into the front lens group varies largely between the tele and wide angle positions so that the height of incidence in the tele position is larger than that in the wide angle position. Due to this fact, in this type of zoom lens system, it is difficult to remove the spherical aberration caused in the front lens group in the tele position.

Figure 1:
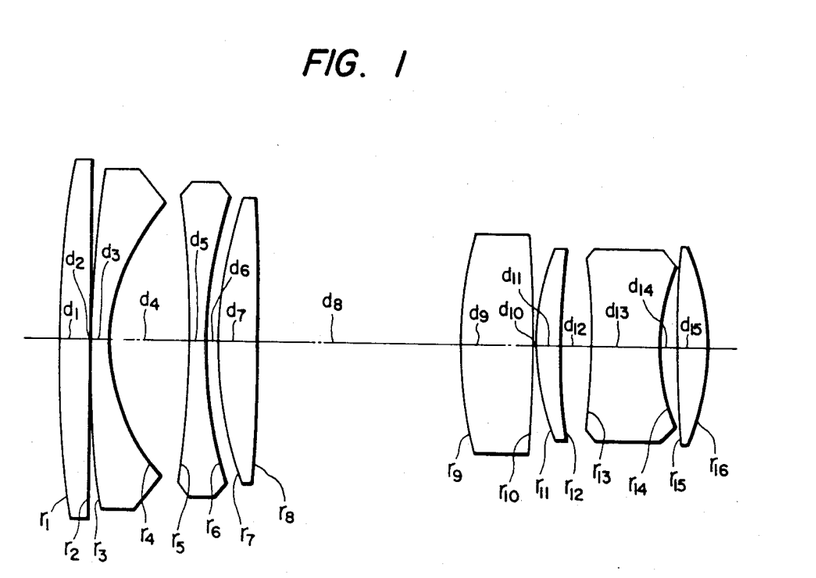
FIG. 1 shows a sectional view illustrating the composition of the zoom lens system according to the present invention.
Figure 2A:
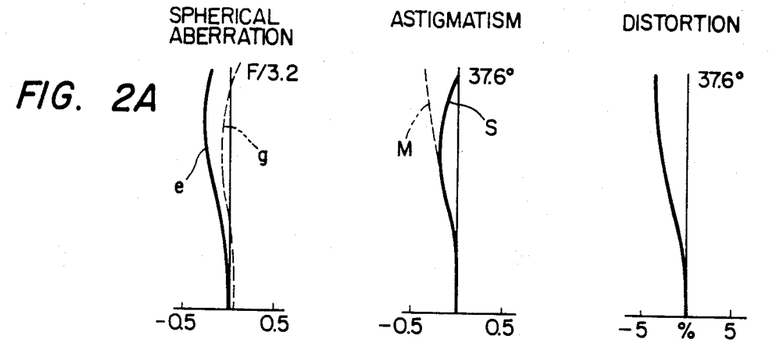
FIGS. 2A, 2B and 2C show curves illustrating the aberration characteristics of a first embodiment of the present invention.
Figure 2B:
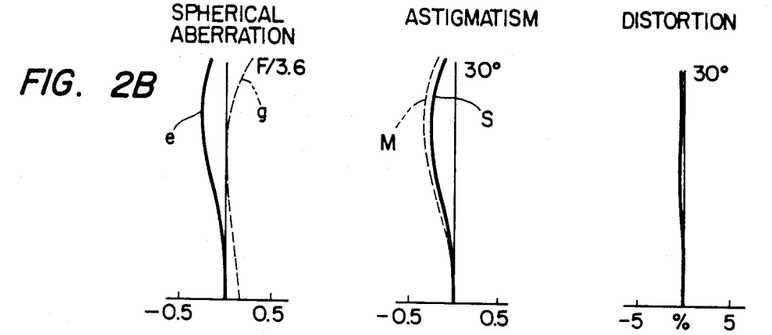
Figure 2C:
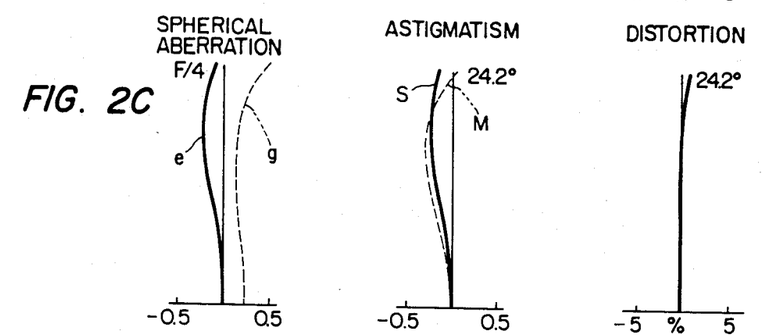
Figure 3A:
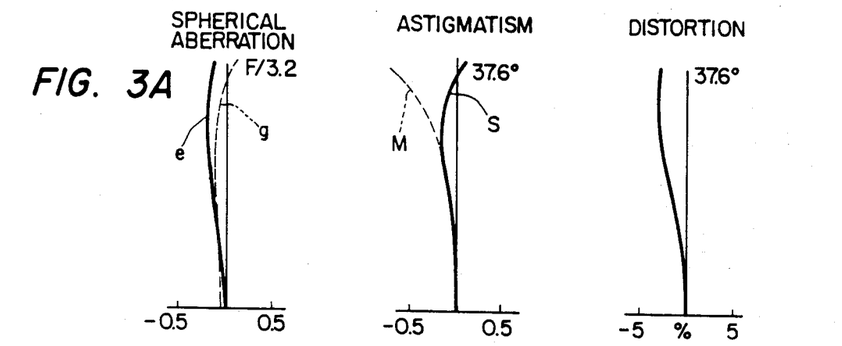
FIGS. 3A, 3B and 3C show curves illustrating the aberration characteristics of a second embodiment of the present invention.
Figure 3B:
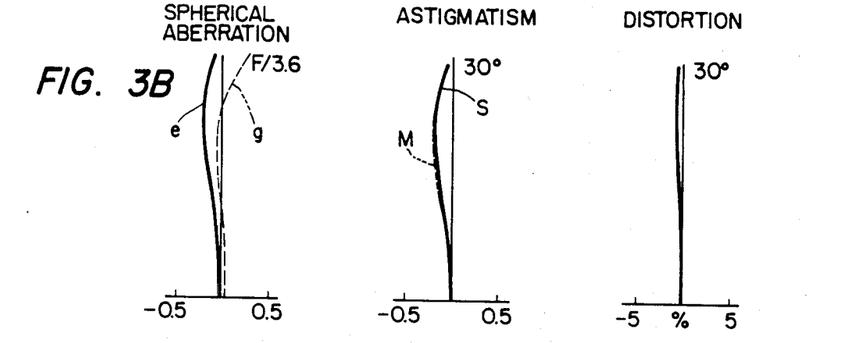
Figure 3C:
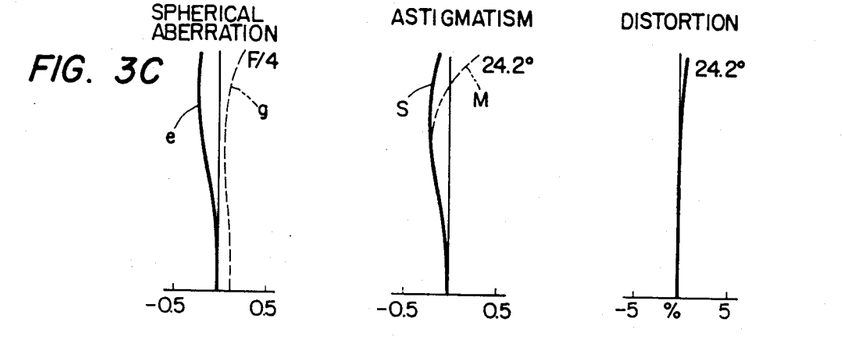
Figure 4A:
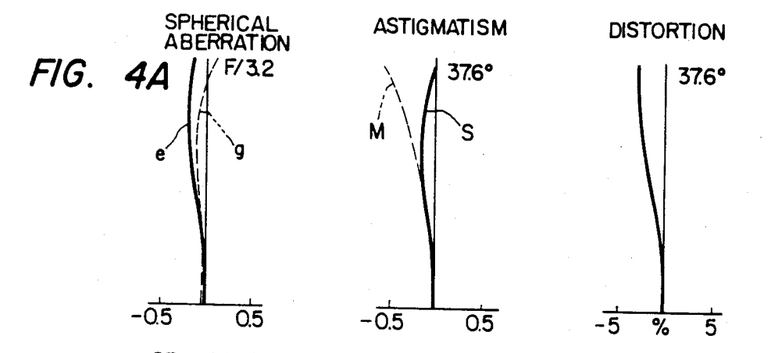
FIGS. 4A, 4B and 4C show curves illustrating the aberration characteristics of a third embodiment of the present invention.
Figure 4B:
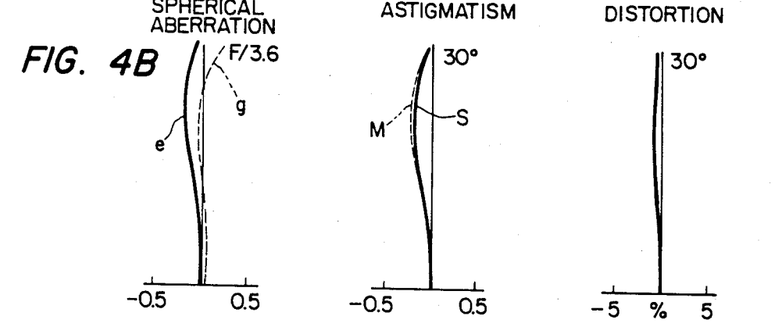
Figure 4C:
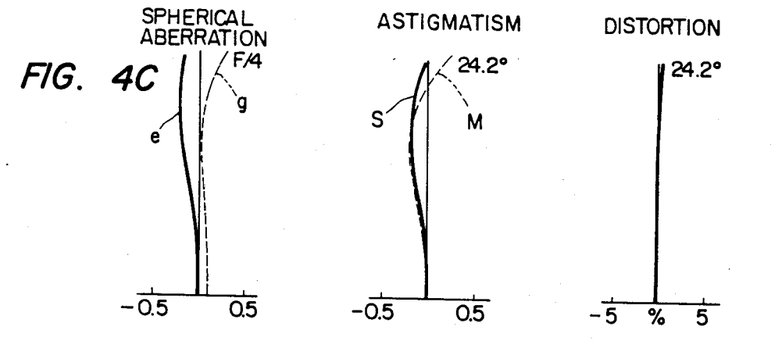
Figure 5A:
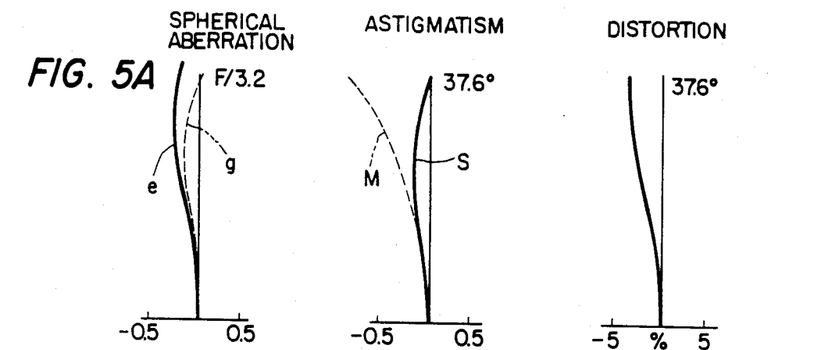
FIGS. 5A, 5B and 5C show curves illustrating the aberration characteristics of a fourth embodiment of the present invention.
Figure 5B:
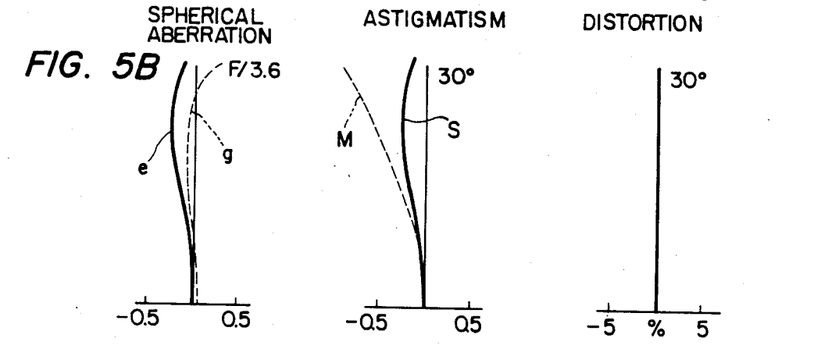
Figure 5C:
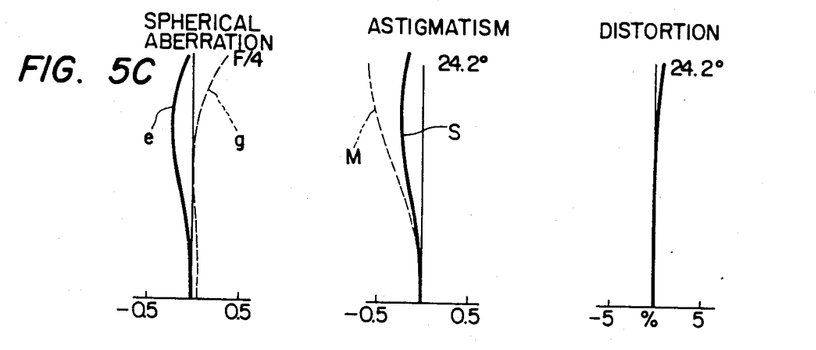
Figure 6A:
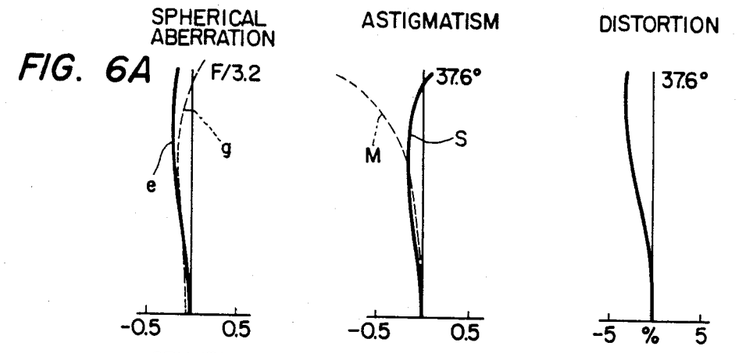
FIGS. 6A, 6B and 6C show curves illustrating the aberration characteristics of a fifth embodiment of the present invention.
Figure 6B:
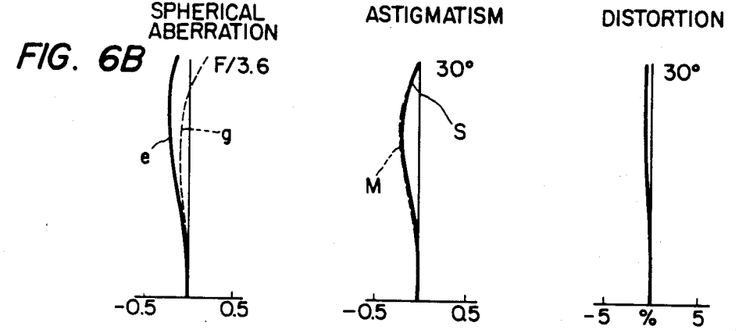
Figure 6C:
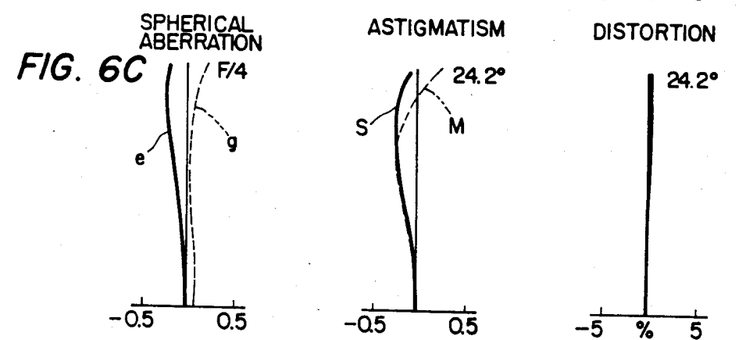
Figure 7A:
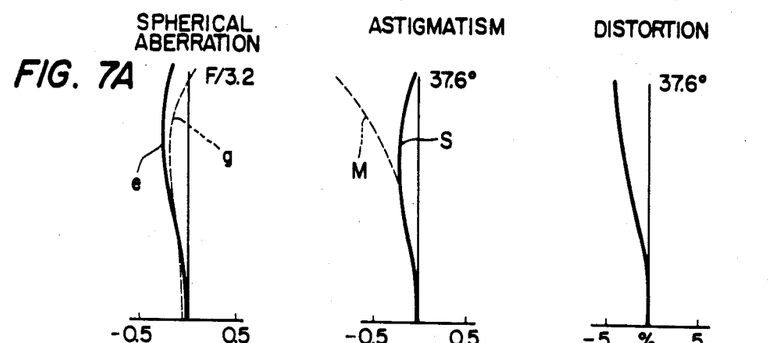
FIGS. 7A, 7B and 7C show curves illustrating the aberration characteristics of a sixth embodiment of the present invention.
Figure 7B:
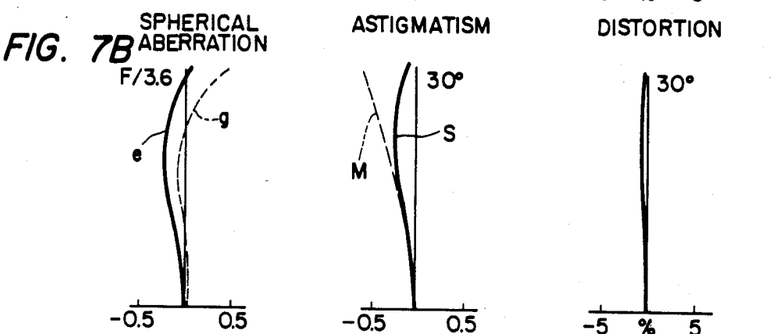
Figure 7C:
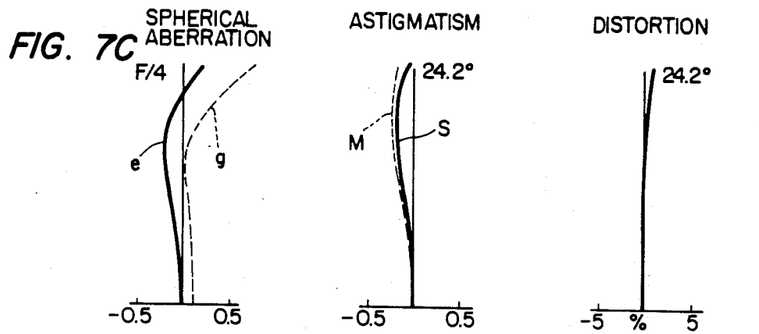
Figure 8A:
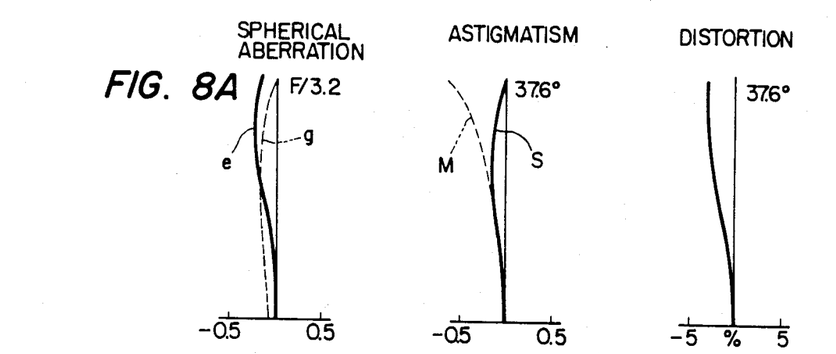
FIGS. 8A, 8B and 8C show curves illustrating the aberration characteristics of a seventh embodiment of the present invention.
Figure 8B:
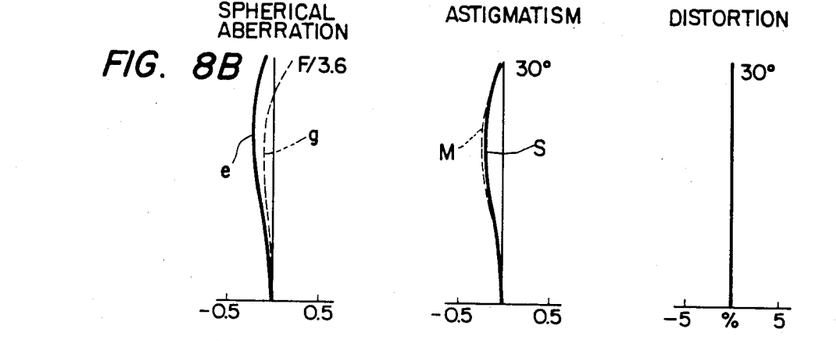
Figure 8C:
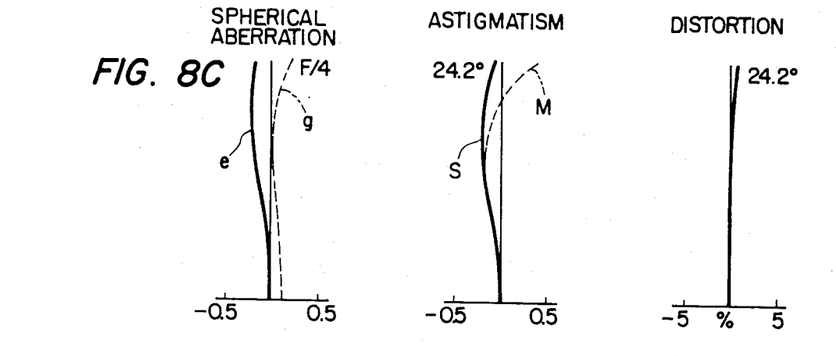
Figure 9A:
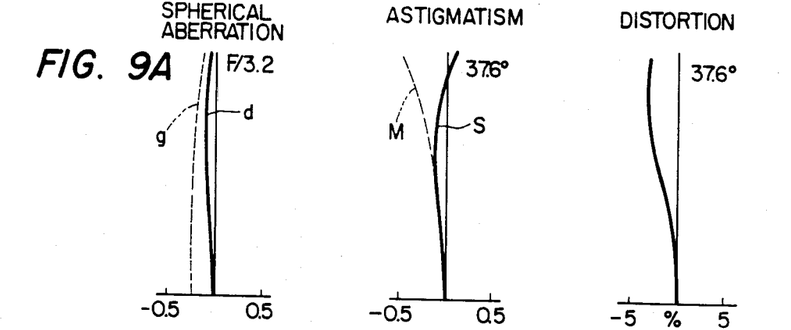
FIGS. 9A, 9B and 9C show curves illustrating the aberration characteristics of a eighth embodiment of the present invention.
Figure 9B:
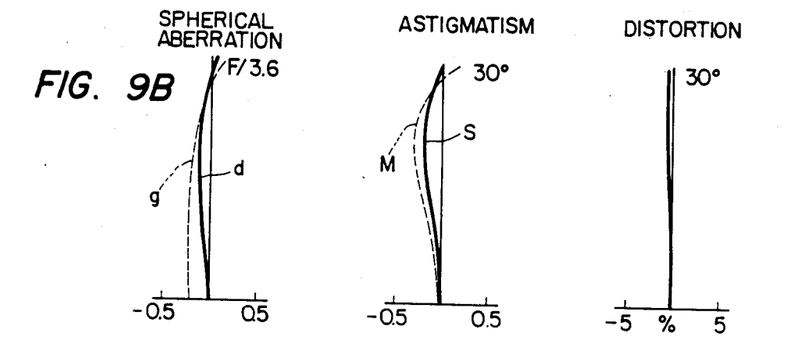
Figure 9C:
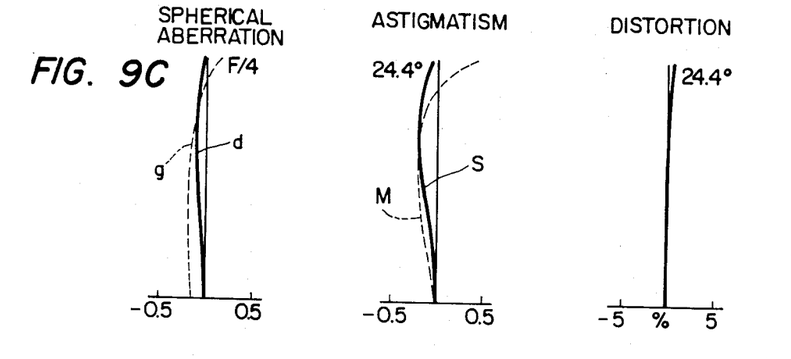
Figure 10A:
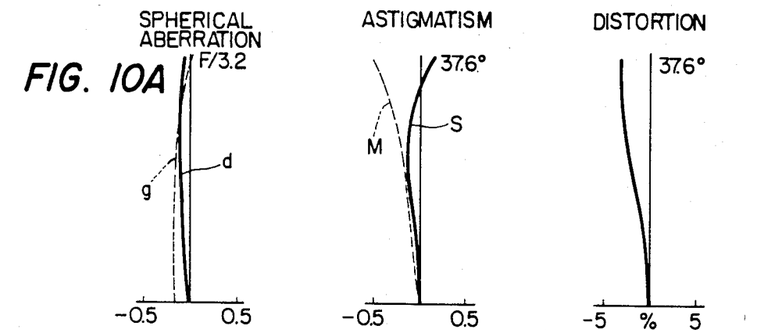
FIGS. 10A, 10B and 10C show curves illustrating the aberration characteristics of a ninth embodiment of the present invention.
Figure 10B:
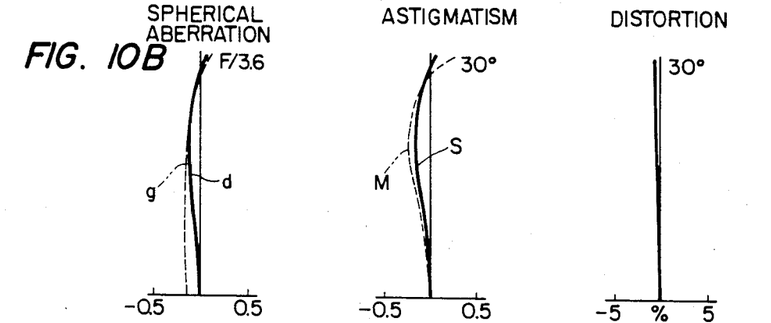
Figure 10C:
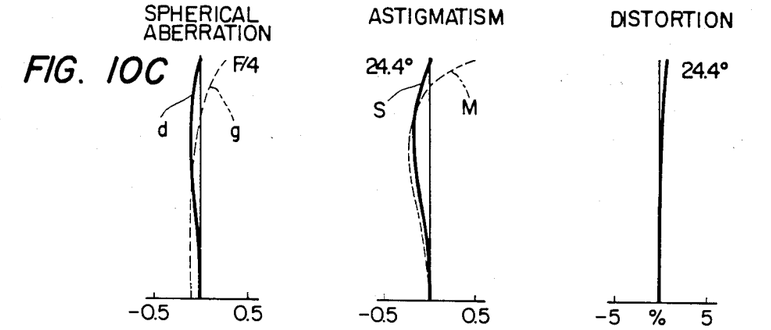

The zoom lens system according to the present invention comprises, as shown in FIG. 1, a front lens group consisting of a first positive lens component, a second negative meniscus lens component having a convex surface on the object side, a third negative lens component and a fourth positive lens component, and a rear lens group consisting of a fifth positive lens component, a sixth positive lens component, a seventh negative lens component and an eighth positive lens component, said lens system being so adapted as to perform zooming by displacing said front and rear lens groups. The object of the present invention is accomplished by designing said zoom lens system so as to satisfy the following conditions:

$$1.8 < r_1/|f_F| < 3.5 \tag{1}$$

$$1.4 < r_3/|f_F| < 9.0 \tag{2}$$

$$0.03 < 1/n_1 - (1/n_2 + 1/n_3)/2 \tag{3}$$

$$1.75 < n_7 \tag{4}$$

$$50 < (\nu_2 + \nu_3)/2 \tag{5}$$

$$0.18 < (d_3 + d_4 + d_5)/|f_F| < 0.3 \tag{6}$$

wherein the reference symbol $f_F$ represents focal length of the front lens group, the reference symbols $r_1$ and $r_3$ designate radii of curvature on the object side surface of the first lens component and on the object side surface of the second lens component respectively, the reference symbols $d_3$ and $d_5$ denote thicknesses of the second and third lens components respectively, the reference symbol $d_4$ represents airspace reserved between the second and third lens component, the reference symbols $n_1$, $n_2$, $n_3$ and $n_7$ designate refractive indices of the first, second, third and seventh lens components respectively, and the reference symbols $\nu_2$ and $\nu_3$ denote Abbe's numbers of the second and third lens components respectively.

Out of the above-mentioned conditions, the conditions (1) and (2) have been defined to remove the spherical aberration to be caused in the front lens group in the tele position which is difficult to remove in a type of the zoom lens system having a constant stop aperture. That is, it is desirable to make the radii of curvature $r_1$ and $r_3$ on the respective object side surface of the first and second lens components as smaller as possible in order to prevent the bulging of the negative spherical aberration from becoming large by positive refraction on the respective object side surfaces of the first and second lens components. According to the present invention, $r_1/|f_F|$ is made larger than 1.8 as stipulated by the condition (1). If $r_1/|f_F|$ is smaller than 1.8, spherical aberration will be aggravated and, if it is attempted to correct the spherical aberration by bendings on the other lens surfaces, offaxial coma will be aggravated to cause undesirable effect. Similarly, if $r_3/|f_F|$ is smaller than 1.4 in the condition (2), spherical aberration will be aggravated and, when it is attempted to correct the spherical aberration by bendings on the other lens surfaces, offaxial coma will be aggravated.

If $r_1$ and $r_3$ are made large to make less severe the curvature of the respective object side surfaces of the first and second lens components, correction of the spherical aberration will be performed favorably. However, according as $r_1$ and $r_3$, particularly $r_3$ become larger, other aberrations will be aggravated. Especially, variation of meridional aberrations will become large upon zooming. Due to the above-mentioned reasons, it is necessary to be so designed that $r_1/|f_F|$ and $r_3/|f_F|$ do not exceed the respective upper limit in the conditions (1) and (2), that is, if $r_1/|f_F|$ is lager than 3.5 in the condition (1), difference in the meridional astigmatism between the wide angle position and tele position will be too large, thereby causing unfavorable effect. Similarly, if $r_3/|f_F|$ is larger than 9 in the condition (2), difference in the meridional astigmatism between the wide angle position and tele position will be large.

The conditions (3) and (4) are required for preventing Petzval's sum from becoming smaller than necessary due to the fact that the negative lens components have powers higher than those of the positive lens components in the entire zoom lens system when field angle is enlarged (approximately 38°) at the wide position in a zoom lens system consisting of two lens groups. Though it is generally said that curvature of field and astigmatic difference are reduced at a smaller Petzval's sum, balance between the paraxial aberration and offaxial aberration poses a problem when it is desired to obtain a flat high quality image over the entire field in a lens system consisting of a small number of lens components. Especially in case where aberrations are apt to change depending on variation of focal length as is the case of a zoom lens system, not only variation of astigmatism due to difference in field angle but also balance among aberrations including those at full aperture and at small aperture in the stop down condition poses problems. It is required not only to favorably correct aberrations including spherical aberration and offaxial aberration in a certain condition but also to maintain desirable lens performance in other conditions. From such a standpoint, it is not advantageous to correct only one type of aberration almost ideally in a single condition in order to correct all types of aberrations with good balance in all conditions. Therefore, the best solution is not to obtain spherical aberration, Petzval's sum and other aberrations as low as possible, but to correct all the aberrations with good balance within allowable ranges. Form this viewpoint, the zoom lens system according to the present invention has been so designed as to prevent Petzval's sum from being minimized excessively.

If $1/n_1 - (1/n_2 + 1/n_3)/2$ is smaller than 0.03 in the condition (3), Petzval's sum is too small, thereby aggravating curvature of field and astigmatic difference cannot be corrected with good balance, thereby degrading image quality. In addition, if $1/n_1 - (1/n_2 + 1/n_3)/2$ is 0.1 to 0.15, it will be difficult to select a glass material which can satisfy this condition and Petzval's sum will be large enough to produce curvature of field and astigmatic difference. Therefore, $1/n_1 - (1/n_2 + 1/n_3)/2$ should preferably be smaller than 0.15.

The condition (4) is required for a purpose similar to that of the condition (3). If $n_7$ is smaller than 1.75, Petzval's sum will be small enough to make it impossible to correct curvature of field and astigmatic difference with good balance, thereby degrading image quality. Though $n_7$ should desirably have a value as large as possible from theoretical viewpoint, it will be selected within a range of $n_7 < 1.9$ taking practically usable materials into consideration.

If $(\nu_2 + \nu_3)/2$ is smaller than 50 in the condition (5), paraxial chromatic aberration, chromatic aberration of magnification and chromatic aberration of coma will largely vary when the zoom lens system is displaced from the wide position to the tele position, thereby making it impossible to correct the chromatic aberrations with good balance. If $(\nu_2 + \nu_3)/2$ exceeds 65 in the condition (5), it will be difficult to obtain a glass material having a refractive index which can satisfy the condition (3), and $(\nu_2 + \nu_3)/2$ should practically be smaller than 65. Theoretically speaking, however, the above-mentioned effect can be obtained when $(\nu_2 + \nu_3)/2$ has a value larger than 65.

If $(d_2 + d_4 + d_5)/|f_F|$ is larger than 0.3 in the condition (6), the front lens group will have not only a long total length but also a long back focal length, making it imposible to obtain a sufficient zooming ratio. If it is attempted to correct these defects by bending on the respective lens surfaces, $f_F$ or radius of curvature $r_8$ on the image side surface of the fourth lens component will be too small, resulting in undesirable effect for correcting aberrations. If $(d_3 + d_4 + d_5)/|f_F|$ is smaller than 0.18, in contrast, the front lens group will have a short back focal length and the entire zoom lens system will have a long total length. In order to shorten the total length of the entire zoom lens system, it will be required to change imaging magnification of the rear lens group, but such a measure will be undesirable for correcting aberrations. Further, attempt to obtain sufficient quantity of offaxial marginal rays will undesirably enlarge diameter of the front lens group.

A lens system having the above-described composition and satisfying the conditions (1) through (6) can accomplish the object of the present invention. However, such a lens system can be more excellent zoom lens system when it is so designed as to satisfy the following additional conditions (7) through (9).

$$1.68 < n_4 \tag{1}$$

$$3 < |r_8|/|f_F| \tag{8}$$

$$0.35 < (d_9 + d_{13})/f_R < 0.5 \tag{9}$$

wherein the reference symbol $r_8$ represents radius of curvature on the image side surface of the fourth lens component, the reference symbols $d_9$ and $d_{13}$ designate thicknesses of the fifth and seventh lens components respectively, the reference symbol $n_4$ denotes refractive index of the fourth lens component and the reference symbol $f_R$ represents focal length of the rear lens group.

If $n_4$ is smaller than 1.68 in the condition (7) out of the above-mentioned conditions, Petzval's sum will be large enough to be desirable for correcting offaxial astigmatism, but it will be obliged to select small radii of curvature $r_7$ and $r_8$ on both the surfaces of the fourth lens component, which will in turn aggravate spherical aberration. If it is attempted to correct the spherical aberration by bendings on the other lens surfaces, offaxial coma will be aggravated, resulting in undesirable effect. In addition, since no glass material having $n_4$ higher than 1.9 is practically utilizable, upper limit of $n_4$ will be on the order of 1.9 though $n_4$ can have a larger value from theoretical viewpoint.

If $|r_8|/|f_F|$ is smaller than 3 in the condition (8), the front lens group will have a long back focal length, thereby making it impossible to obtain a sufficient zooming ratio. If it is attempted to correct it by bendings on the other lens surfaces, $r_2$, $r_4$ and $|r_5|$ will have small values which are undesirable for correcting aberrations. If $(d_9+d_{13})/f_R$ is larger than 0.5 in the condition (9), coma and chromatic aberrations of magnification will be corrected favorably, but total length of the zoom lens system as a whole will be undesirably prolonged. If $(d_9+d_{13})/f_R$ is smaller than 0.35, in contrast, coma and lateral chromatic aberration will be aggravated at the wide position, making it impossible to obtain sufficient zooming ratio and favorable zoom lens performance.

Moreover, the zoom lens system according to the present invention can be still more excellent when it is so designed as to satisfy the following conditions (10) and (11).

$$0.55 < |r_{16}|/f_R < 1.2 \quad (10)$$

$$1.6 < (n_5+n_6+n_8)/3 < 1.7 \quad (11)$$

wherein the reference symbol $r_{16}$ represents radius of curvature on the image side surface of the eighth lens component, and the reference symbols $n_5$, $n_6$ and $n_8$ designate refractive indices of the fifth, sixth and eighth lens components respectively.

If $|r_{16}|/f_R$ is larger than 1.2 in the condition (10), the rear lens group will have a long back focal length, thereby making it impossible to obtain a sufficiently magnified image at the tele position. In order to shorten the back focal length of the rear lens group, it is required to change imaging magnification of the rear lens group, but such a change will increase variation of the airspace $d_8$ reserved between the front and rear lens groups, resulting in undesirable effect. If $|r_{16}|/f_R$ is smaller than 0.55, in contrast, the rear lens group will have a short back focal length and the entire zoom lens system as a whole will also have a short back focal length at the wide position, resulting in undesirable effect. In order to prolong the back focal length, it will be required to change the imaging magnification of the rear lens system so as to enlarge the value of $f_R$, which will in turn undesirably prolong total length of the zoom lens system as a whole.

If $(n_5+n_6+n_8)/3$ is larger than 1.7 in the condition (11), Petzval's sum will be too small to correct curvature of field and astigmatic difference with good balance, thereby degrading image quality. If $(n_5+n_6+n_8)/3$ is smaller than the lower limit of 1.6, in contrast, spherical aberration will be aggravated in the rear lens group and, if it is attempted to correct the spherical aberration by bendings on the respective lens surfaces in the rear lens group, coma and astigmatism will be aggravated.

Further, it is favorable for the correction of spherical aberration that $r_3/|f_F|$ is large as described above. Therefore, it is more desirable that $r_3/|f_F|$ is within such range as expressed by $4.5 < r_3/|f_F| < 9$. However, as described above, it is desirable for astigmatism that $r_3/|f_F|$ is not too large. In this case, it is effective to make difference in the meridional astigmatism between the wide angle position and tele position small to make airspace $d_{12}$ reserved between the sixth and seventh lens components. Due to that purpose, it is desirable to make $d_{12}/f_R$ larger than 0.11. However, making $d_{12}/f_R$ larger than 0.16 is not favorable because total length of the zoom lens system becomes large. Accordingly, it is favorable that $d_{12}/f_R$ is within such range as is expressed by the following condition (12):

$$0.11 < d_{12}/f_R < 0.16 \quad (12)$$

It is most desirable to design the zoom lens system so as to satisfy the following conditions to provide a lens system having very favorably corrected spherical aberration and small difference in the meridional astigmatism between the wide angle position and tele position.

$$0.5 < r_3/|f_F| < 9$$
$$0.11 < d_{12}/f_R < 0.16$$

DESCRIPTION OF THE PREFERRED EMBODIMENTS

Now, numerical data will be described below as preferred embodiments of the zoom lens system according to the present invention.

Embodiment 1
$r_1 = 127.858$
$d_1 = 2.89$ $\quad n_1 = 1.51825 \quad \nu_1 = 64.15$
$r_2 = -5305.436$
$d_2 = 0.10$
$r_3 = 133.964$
$d_3 = 1.40$ $\quad n_2 = 1.64129 \quad \nu_2 = 55.38$
$r_4 = 19.583$
$d_4 = 8.06$
$r_5 = -106.781$
$d_5 = 2.45$ $\quad n_3 = 1.60548 \quad \nu_3 = 60.70$
$r_6 = 43.081$
$d_6 = 2.68$
$r_7 = 37.460$
$d_7 = 3.90$ $\quad n_4 = 1.81077 \quad \nu_4 = 40.95$
$r_8 = 361.218$
$d_8 = 1.04 \sim 23.69$
$r_9 = 39.590$ -continued

| | | |
|---|---|---|
| $d_9 = 8.40$ | | |
| $r_{10} = -187.882$ | $n_5 = 1.73234$ | $\nu_5 = 54.68$ |
| $d_{10} = 0.40$ | | |
| $r_{11} = 25.160$ | | |
| $d_{11} = 3.03$ | $n_6 = 1.61770$ | $\nu_6 = 51.17$ |
| $r_{12} = -797.384$ | | |
| $d_{12} = 3.01$ | | |
| $r_{13} = -46.421$ | | |
| $d_{13} = 7.62$ | $n_7 = 1.81265$ | $\nu_7 = 25.43$ |
| $r_{14} = 22.055$ | | |
| $d_{14} = 1.50$ | | |
| $r_{15} = 139.658$ | | |
| $d_{15} = 3.14$ | $n_8 = 1.67133$ | $\nu_8 = 41.93$ |
| $r_{16} = -24.057$ | | |
| $f = 28.09 \sim 48.06$, | $\omega = 37.6° \sim 24.2°$ | |
| $f_F = -47.368$, | $f_R = 34.295$ | |
| $r_1/|f_F| = 2.699$, | $r_3/|f_F| = 2.828$ | |

$$\frac{1}{n_1} - \left(\frac{1}{n_2} + \frac{1}{n_3}\right)/2 = 0.0426$$

| | |
|---|---|
| $(\nu_2 + \nu_3)/2 = 58.04$, | $(d_3 + d_4 + d_5)/|f_F| = 0.251$ |
| $|r_8|/|f_F| = 7.626$, | $(d_9 + d_{13})/f_R = 0.467$ |
| $|r_{16}|/f_R = 0.702$, | $(n_5 + n_6 + n_8)/3 = 1.67379$ |

Embodiment 2

| | | |
|---|---|---|
| $r_1 = 113.512$ | | |
| $d_1 = 3.50$ | $n_1 = 1.51825$ | $\nu_1 = 64.15$ |
| $r_2 = \infty$ | | |
| $d_2 = 0.10$ | | |
| $r_3 = 95.689$ | | |
| $d_3 = 1.46$ | $n_2 = 1.64368$ | $\nu_2 = 56.93$ |
| $r_4 = 17.951$ | | |
| $d_4 = 8.90$ | | |
| $r_5 = -70.316$ | | |
| $d_5 = 1.20$ | $n_3 = 1.73234$ | $\nu_3 = 54.68$ |
| $r_6 = 49.671$ | | |
| $d_6 = 1.63$ | | |
| $r_7 = 37.333$ | | |
| $d_7 = 4.50$ | $n_4 = 1.80401$ | $\nu_4 = 42.24$ |
| $r_8 = -229.690$ | | |
| $d_8 = 2.26 \sim 25.34$ | | |
| $r_9 = 46.763$ | | |
| $d_9 = 7.16$ | $n_5 = 1.61377$ | $\nu_5 = 55.92$ |
| $r_{10} = -57.086$ | | |
| $d_{10} = 0.40$ | | |
| $r_{11} = 20.230$ | | |
| $d_{11} = 2.75$ | $n_6 = 1.61770$ | $\nu_6 = 51.17$ |
| $r_{12} = 60.638$ | | |
| $d_{12} = 2.98$ | | |
| $r_{13} = -68.403$ | | |
| $d_{13} = 8.02$ | $n_7 = 1.79177$ | $\nu_7 = 26.22$ |
| $r_{14} = 20.304$ | | |
| $d_{14} = 2.14$ | | |
| $r_{15} = 100.850$ | | |
| $d_{15} = 3.47$ | $n_8 = 1.64268$ | $\nu_8 = 44.88$ |
| $r_{16} = -25.935$ | | |
| $f = 28.09 \sim 48.06$, | $\omega = 37.6° \sim 24.2°$ | |
| $f_F = -46.887$, | $f_R = 34.828$ | |
| $r_1/|f_F| = 2.421$, | $r_3/|f_F| = 2.041$ | |

$$\frac{1}{n_1} - \left(\frac{1}{n_2} + \frac{1}{n_3}\right)/2 = 0.0659,$$

| | |
|---|---|
| $(\nu_2 + \nu_3)/2 = 55.81$, | $(d_3 + d_4 + d_5)/|f_F| = 0.247$ |
| $|r_8|/|f_F| = 4.899$, | $(d_9 + d_{13})/f_R = 0.436$ |
| $|r_{16}|/f_R = 0.745$, | $(n_5 + n_6 + n_8)/3 = 1.62472$ |

Embodiment 3

| | | |
|---|---|---|
| $r_1 = 100.042$ | | |
| $d_1 = 3.10$ | $n_1 = 1.51825$ | $\nu_1 = 64.15$ |
| $r_2 = 1906.586$ | | |
| $d_2 = 0.10$ | | |
| $r_3 = 108.871$ | | |
| $d_3 = 1.46$ | $n_2 = 1.73234$ | $\nu_2 = 54.68$ |
| $r_4 = 19.330$ | | |
| $d_4 = 8.52$ | | |
| $r_5 = -78.996$ | | |
| $d_5 = 1.20$ | $n_3 = 1.73234$ | $\nu_3 = 54.68$ |
| $r_6 = 52.609$ | | |
| $d_6 = 2.17$ | | |
| $r_7 = 40.258$ | | |
| $d_7 = 4.20$ | $n_4 = 1.81077$ | $\nu_4 = 40.95$ |
| $r_8 = -212.269$ | | |
| $d_8 = 0.91 \sim 24.21$ | | |
| $r_9 = 45.876$ | | |
| $d_9 = 7.79$ | $n_5 = 1.61377$ | $\nu_5 = 55.92$ |
| $r_{10} = -67.744$ | | |
| $d_{10} = 0.41$ | | |
| $r_{11} = 22.403$ | | |
| $d_{11} = 2.59$ | $n_6 = 1.61770$ | $\nu_6 = 51.17$ |
| $r_{12} = 118.006$ | | |
| $d_{12} = 3.23$ | | |
| $r_{13} = -59.260$ | | |
| $d_{13} = 8.49$ | $n_7 = 1.79177$ | $\nu_7 = 26.22$ |
| $r_{14} = 21.536$ | | |
| $d_{14} = 2.16$ | | |
| $r_{15} = 250.069$ | | |
| $d_{15} = 3.23$ | $n_8 = 1.72372$ | $\nu_8 = 46.03$ |
| $r_{16} = -26.092$ | | |
| $f = 28.09 \sim 48.06$, | $\omega = 37.6° \sim 24.2°$ | |
| $f_F = -46.874$, | $f_R = 35.192$ | |
| $r_1/|f_F| = 2.134$, | $r_3/|f_F| = 2.323$ | |

$$\frac{1}{n_1} - \left(\frac{1}{n_2} + \frac{1}{n_3}\right)/2 = 0.0814$$

| | |
|---|---|
| $(\nu_2 + \nu_3)/2 = 54.68$, | $(d_3 + d_4 + d_5)/|f_F| = 0.238$ |
| $|r_8|/|f_F| = 4.529$, | $(d_9 + d_{13})/f_R = 0.462$ |
| $|r_{16}|/f_R = 0.741$, | $(n_5 + n_6 + n_8)/3 = 1.65173$ |

Embodiment 4

| | | |
|---|---|---|
| $r_1 = 119.467$ | | |
| $d_1 = 3.00$ | $n_1 = 1.51825$ | $\nu_1 = 64.15$ |
| $r_2 = -1146.097$ | | |
| $d_2 = 0.10$ | | |
| $r_3 = 183.494$ | | |
| $d_3 = 1.48$ | $n_2 = 1.73234$ | $\nu_2 = 54.68$ |
| $r_4 = 19.785$ | | |
| $d_4 = 6.91$ | | |
| $r_5 = -118.630$ | | |
| $d_5 = 1.43$ | $n_3 = 1.64254$ | $\nu_3 = 60.09$ |
| $r_6 = 46.661$ | | |
| $d_6 = 2.42$ | | |
| $r_7 = 37.163$ | | |
| $d_7 = 3.9$ | $n_4 = 1.81077$ | $\nu_4 = 40.95$ |
| $r_8 = -1947.670$ | | |
| $d_8 = 0.54 \sim 23.36$ | | |
| $r_9 = 37.763$ | | |
| $d_9 = 9.18$ | $n_5 = 1.73234$ | $\nu_5 = 54.68$ |
| $r_{10} = -96.398$ | | |
| $d_{10} = 0.40$ | | |
| $r_{11} = 26.130$ | | |
| $d_{11} = 2.69$ | $n_6 = 1.61770$ | $\nu_6 = 51.17$ |
| $r_{12} = -515.202$ | | |
| $d_{12} = 2.39$ | | |
| $r_{13} = -39.463$ | | |
| $d_{13} = 7.33$ | $n_7 = 1.79177$ | $\nu_7 = 26.22$ |
| $r_{14} = 22.145$ | | |
| $d_{14} = 2.10$ | | |
| $r_{15} = -279.593$ | | |
| $d_{15} = 3.14$ | $n_8 = 1.67133$ | $\nu_8 = 41.93$ |
| $r_{16} = -20.941$ | | |
| $f = 28.09 \sim 48.06$, | $\omega = 37.6° \sim 24.2°$ | |
| $f_F = -47.411$, | $f_R = 34.287$ | |
| $r_1/|f_F| = 2.520$, | $r_3/|f_F| = 3.870$ | |

$$\frac{1}{n_1} - \left(\frac{1}{n_2} + \frac{1}{n_3}\right)/2 = 0.0656$$

| | |
|---|---|
| $(\nu_2 + \nu_3)/2 = 57.39$, | $(d_3 + d_4 + d_5)/|f_F| = 0.207$ |
| $|r_8|/|f_F| = 41.08$, | $(d_9 + d_{13})/f_R = 0.481$ |
| $|r_{16}|/f_R = 0.611$, | $(n_5 + n_6 + n_8)/3 = 1.67379$ |

Embodiment 5

| | | |
|---|---|---|
| $r_1 = 121.454$ | | |
| $d_1 = 3.50$ | $n_1 = 1.51825$ | $\nu_1 = 64.15$ |
| $r_2 = -861.816$ | | |
| $d_2 = 0.10$ | | |
| $r_3 = 107.246$ | | |
| $d_3 = 1.46$ | $n_2 = 1.64368$ | $\nu_2 = 56.93$ |
| $r_4 = 18.249$ | | |

-continued

| | | |
|---|---|---|
| $d_4 = 9.42$ | | |
| $r_5 = -70.215$ | | |
| $d_5 = 1.20$ | $n_3 = 1.64368$ | $\nu_3 = 56.93$ |
| $r_6 = 42.396$ | | |
| $d_6 = 1.39$ | | |
| $r_7 = 35.023$ | | |
| $d_7 = 4.50$ | $n_4 = 1.80401$ | $\nu_4 = 42.24$ |
| $r_8 = -496.198$ | | |
| $d_8 = 1.60 \sim 24.60$ | | |
| $r_9 = 46.961$ | | |
| $d_9 = 6.30$ | $n_5 = 1.61377$ | $\nu_5 = 55.92$ |
| $r_{10} = -59.252$ | | |
| $d_{10} = 0.40$ | | |
| $r_{11} = 19.829$ | | |
| $d_{11} = 2.64$ | $n_6 = 1.61770$ | $\nu_6 = 51.17$ |
| $r_{12} = 53.772$ | | |
| $d_{12} = 3.28$ | | |
| $r_{13} = -69.625$ | | |
| $d_{13} = 7.85$ | $n_7 = 1.79177$ | $\nu_7 = 26.22$ |
| $r_{14} = 20.092$ | | |
| $d_{14} = 2.12$ | | |
| $r_{15} = 72.179$ | | |
| $d_{15} = 3.44$ | $n_8 = 1.64268$ | $\nu_8 = 44.88$ |
| $r_{16} = -26.476$ | | |
| $f = 28.09 \sim 48.06$, | $\omega = 37.6° \sim 24.2°$ | |
| $f_F = -46.872$, | $f_R = 34.828$ | |
| $r_1/|f_F| = 2.591$, | $r_3/|f_F| = 2.288$ | |

$$\frac{1}{n_1} - \left(\frac{1}{n_2} + \frac{1}{n_3}\right)/2 = 0.0503$$

| | |
|---|---|
| $(\nu_2 + \nu_3)/2 = 56.93$, | $(d_3 + d_4 + d_5)/|f_F| = 0.258$ |
| $|r_8|/|f_F| = 10.586$, | $(d_9 + d_{13})/f_R = 0.41$ |
| $|r_{16}|/f_R = 0.760$, | $(n_5 + n_6 + n_8)/3 = 1.62472$ |

Embodiment 6

| | | |
|---|---|---|
| $r_1 = 144.789$ | | |
| $d_1 = 3.00$ | $n_1 = 1.51825$ | $\nu_1 = 64.15$ |
| $r_2 = 2330.391$ | | |
| $d_2 = 0.10$ | | |
| $r_3 = 110.076$ | | |
| $d_3 = 1.48$ | $n_2 = 1.73234$ | $\nu_2 = 54.68$ |
| $r_4 = 19.245$ | | |
| $d_4 = 7.10$ | | |
| $r_5 = -75.558$ | | |
| $d_5 = 1.90$ | $n_3 = 1.73234$ | $\nu_3 = 54.68$ |
| $r_6 = 105.490$ | | |
| $d_6 = 2.51$ | | |
| $r_7 = 42.547$ | | |
| $d_7 = 3.90$ | $n_4 = 1.70559$ | $\nu_4 = 41.10$ |
| $r_8 = -243.568$ | | |
| $d_8 = 0.79 \sim 23.61$ | | |
| $r_9 = 32.265$ | | |
| $d_9 = 7.97$ | $n_5 = 1.66123$ | $\nu_5 = 53.44$ |
| $r_{10} = -66.369$ | | |
| $d_{10} = 0.40$ | | |
| $r_{11} = 22.928$ | | |
| $d_{11} = 2.49$ | $n_6 = 1.61770$ | $\nu_6 = 51.17$ |
| $r_{12} = 100.148$ | | |
| $d_{12} = 2.65$ | | |
| $r_{13} = -41.462$ | | |
| $d_{13} = 6.37$ | $n_7 = 1.79177$ | $\nu_7 = 26.22$ |
| $r_{14} = 20.801$ | | |
| $d_{14} = 2.10$ | | |
| $r_{15} = -262.716$ | | |
| $d_{15} = 3.14$ | $n_8 = 1.67133$ | $\nu_8 = 41.93$ |
| $r_{16} = -20.839$ | | |
| $f = 28.09 \sim 48.06$, | $\omega = 37.6° \sim 24.2°$ | |
| $f_F = -47.368$, | $f_R = 34.294$ | |
| $r_1/|f_F| = 3.057$, | $r_3/|f_F| = 2.324$ | |

$$\frac{1}{n_1} - \left(\frac{1}{n_2} + \frac{1}{n_3}\right)/2 = 0.0814$$

| | |
|---|---|
| $(\nu_2 + \nu_3)/2 = 54.68$, | $(d_3 + d_4 + d_5)/|f_F| = 0.221$ |
| $|r_8|/|f_F| = 5.142$, | $(d_9 + d_{13})/f_R = 0.418$ |
| $|r_{16}|/f_R = 0.608$, | $(n_5 + n_6 + n_8)/3 = 1.65009$ |

Embodiment 7

| | | |
|---|---|---|
| $r_1 = 105.685$ | | |
| $d_1 = 3.47$ | $n_1 = 1.51825$ | $\nu_1 = 64.15$ |
| $r_2 = 5283.200$ | | |
| $d_2 = 0.10$ | | |
| $r_3 = 100.244$ | | |
| $d_3 = 1.70$ | $n_2 = 1.68082$ | $\nu_2 = 55.33$ |
| $r_4 = 17.968$ | | |
| $d_4 = 8.90$ | | |
| $r_5 = -64.869$ | | |
| $d_5 = 1.70$ | $n_3 = 1.68082$ | $\nu_3 = 55.33$ |
| $r_6 = 57.540$ | | |
| $d_6 = 1.28$ | | |
| $r_7 = 37.798$ | | |
| $d_7 = 4.44$ | $n_4 = 1.80401$ | $\nu_4 = 42.24$ |
| $r_8 = -323.157$ | | |
| $d_8 = 1.11 \sim 23.56$ | | |
| $r_9 = 45.023$ | | |
| $d_9 = 7.79$ | $n_5 = 1.61634$ | $\nu_5 = 56.36$ |
| $r_{10} = -60.844$ | | |
| $d_{10} = 0.39$ | | |
| $r_{11} = 20.282$ | | |
| $d_{11} = 2.64$ | $n_6 = 1.61022$ | $\nu_6 = 49.29$ |
| $r_{12} = 73.663$ | | |
| $d_{12} = 3.13$ | | |
| $r_{13} = -66.564$ | | |
| $d_{13} = 7.33$ | $n_7 = 1.79177$ | $\nu_7 = 26.22$ |
| $r_{14} = 20.131$ | | |
| $d_{14} = 2.10$ | | |
| $r_{15} = 126.961$ | | |
| $d_{15} = 3.37$ | $n_8 = 1.68613$ | $\nu_8 = 44.65$ |
| $r_{16} = -26.715$ | | |
| $f = 28.09 \sim 48.06$, | $\omega = 37.6° \sim 24.2°$ | |
| $f_F = -46.404$, | $f_R = 34.134$ | |
| $r_1/|f_F| = 2.277$, | $r_3/|f_F| = 2.160$ | |

$$\frac{1}{n_1} - \left(\frac{1}{n_2} + \frac{1}{n_3}\right)/2 = 0.0637$$

| | |
|---|---|
| $(\nu_2 + \nu_3)/2 = 55.33$, | $(d_3 + d_4 + d_5)/|f_F| = 0.265$ |
| $|r_8|/|f_F| = 6.964$, | $(d_9 + d_{13})/f_R = 0.443$ |
| $|r_{16}|/f_R = 0.783$, | $(n_5 + n_6 + n_8)/3 = 1.63756$ |

Embodiment 8

| | | |
|---|---|---|
| $r_1 = 137.314$ | | |
| $d_1 = 3.86$ | $n_1 = 1.48749$ | $\nu_1 = 70.15$ |
| $r_2 = -222.000$ | | |
| $d_2 = 0.1$ | | |
| $r_3 = 311.605$ | | |
| $d_3 = 1.25$ | $n_2 = 1.691$ | $\nu_2 = 54.84$ |
| $r_4 = 18.385$ | | |
| $d_4 = 8.57$ | | |
| $r_5 = -67.036$ | | |
| $d_5 = 1.65$ | $n_3 = 1.691$ | $\nu_3 = 54.84$ |
| $r_6 = 65.522$ | | |
| $d_6 = 1.12$ | | |
| $r_7 = 39.146$ | | |
| $d_7 = 5.1$ | $n_4 = 1.79952$ | $\nu_4 = 42.24$ |
| $r_8 = -175.987$ | | |
| $d_8 = 0.4 \sim 23.43$ | | |
| $r_9 = 46.836$ | | |
| $d_9 = 6.87$ | $n_5 = 1.62299$ | $\nu_5 = 58.14$ |
| $r_{10} = -71.855$ | | |
| $d_{10} = 0.1$ | | |
| $r_{11} = 19.837$ | | |
| $d_{11} = 3.14$ | $n_6 = 1.62299$ | $\nu_6 = 58.14$ |
| $r_{12} = 46.162$ | | |
| $d_{12} = 4.31$ | | |
| $r_{13} = -77.407$ | | |
| $d_{13} = 6.94$ | $n_7 = 1.78472$ | $\nu_7 = 25.7$ |
| $r_{14} = 19.549$ | | |
| $d_{14} = 1.00$ | | |
| $r_{15} = 52.302$ | | |
| $d_{15} = 3.23$ | $n_8 = 1.72342$ | $\nu_8 = 38.03$ |
| $r_{16} = -33.197$ | | |
| $f = 28.09 \sim 47.5$, | $\omega = 37.6° \sim 24.4°$ | |
| $f_F = -46.498$, | $f_R = 34.168$ | |
| $r_1/|f_F| = 2.95$, | $r_3/|f_F| = 6.7$ | |

$$\frac{1}{n_1} - \left(\frac{1}{n_2} + \frac{1}{n_3}\right)/2 = 0.0809$$

| | |
|---|---|
| $(\nu_2 + \nu_3)/2 = 54.84$, | $(d_3 + d_4 + d_5)/|f_F| = 0.247$ |

-continued $|r_8|/|f_F| = 3.785,$
$|r_{16}|/f_R = 0.972,$ $(d_9 + d_{13})/f_R = 0.404$
$(n_5 + n_6 + n_8)/3 = 1.65647$

Embodiment 9

| | | |
|---|---|---|
| $r_1 = 134.898$ | | |
| $d_1 = 3.89$ | $n_1 = 1.49831$ | $\nu_1 = 65.03$ |
| $r_2 = -233.499$ | | |
| $d_2 = 0.1$ | | |
| $r_3 = 377.021$ | | |
| $d_3 = 1.25$ | $n_2 = 1.6968$ | $\nu_2 = 55.52$ |
| $r_4 = 19.288$ | | |
| $d_4 = 8.76$ | | |
| $r_5 = -97.151$ | | |
| $d_5 = 1.64$ | $n_3 = 1.6968$ | $\nu_3 = 55.52$ |
| $r_6 = 53.184$ | | |
| $d_6 = 1.54$ | | |
| $r_7 = 37.855$ | | |
| $d_7 = 5.05$ | $n_4 = 1.8061$ | $\nu_4 = 40.95$ |
| $r_8 = -366.117$ | | |
| $d_8 = 0.37 \sim 23.4$ | | |
| $r_9 = 41.265$ | | |
| $d_9 = 5.98$ | $n_5 = 1.62041$ | $\nu_5 = 60.27$ |
| $r_{10} = -76.125$ | | |
| $d_{10} = 0.1$ | | |
| $r_{11} = 20.625$ | | |
| $d_{11} = 2.87$ | $n_6 = 1.62041$ | $\nu_6 = 60.27$ |
| $r_{12} = 53.136$ | | |
| $d_{12} = 4.31$ | | |
| $r_{13} = -67.244$ | | |
| $d_{13} = 6.85$ | $n_7 = 1.7847$ | $\nu_7 = 26.22$ |
| $r_{14} = 19.866$ | | |
| $d_{14} = 1.28$ | | |
| $r_{15} = 67.611$ | | |
| $d_{15} = 3.35$ | $n_8 = 1.72342$ | $\nu_8 = 38.03$ |
| $r_{16} = -30.241$ | | |
| $f = 28.09 \sim 47.5,$ | $\omega = 37.6° \sim 24.4°$ | |
| $f_F = -46.498,$ | $f_R = 34.168$ | |
| $r_1/|f_F| = 2.901$ | $r_3/|f_F| = 8.108$ | |

$$\frac{1}{n_1} - \left(\frac{1}{n_2} + \frac{1}{n_3}\right)/2 = 0.0781$$

$(\nu_2 + \nu_3)/2 = 55.52,$
$|r_8|/|f_F| = 7.874,$
$|r_{16}|/f_R = 0.885,$ $(d_3 + d_4 + d_5)/|f_F| = 0.250$
$(d_9 + d_{13})/f_R = 0.375$
$(n_5 + n_6 + n_8)/3 = 1.65475$ wherein the reference symbols $r_1$ through $r_{16}$ represent radii of curvature on the surfaces of the respective lens components, the reference symbols $d_1$ through $d_{15}$ designate thicknesses of the respective lens components and airspaces reserved therebetween, the reference symbols $n_1$ through $n_8$ denote refractive indices of the respective lens components, the reference symbols $\nu_1$ through $\nu_8$ represent Abbe's numbers of the respective lens components, the reference symbol f designates focal length of the entire zoom lens system as a whole, the reference symbol $\omega$ denotes half field angle, the reference symbol $f_F$ represents focal length of the front lens group and the reference symbol $f_R$ designates focal length of the rear lens group.

Out of the curves illustrating the aberration characteristics of the above-mentioned embodiments of the present invention, FIG. 2A, FIG. 3A, FIG. 4A, FIG. 5A, FIG. 6A, FIG. 7A, FIG. 8A, FIG. 9A and FIG. 10A visualize aberrations at the wide position, FIG. 2B, FIG. 3B, FIG. 4B, FIG. 5B, FIG. 6B, FIG. 7B, FIG. 8B, FIG. 9B and FIG. 10B visualize the aberrations at an intermediate field angle, and FIG. 2C, FIG. 3C, FIG. 4C, FIG. 5C, FIG. 6C, FIG. 7C, FIG. 8C, FIG. 9C and FIG. 10C visualize aberrations at the tele position.

I claim:
1. A zoom lens system comprising a front lens group consisting of a first positive lens component, a second negative meniscus lens component having a convex surface on the image side, a third negative lens component, and fourth positive lens component, and a rear lens group consisting of a fifth positive lens component, a sixth positive lens component, a seventh negative lens component and an eighth positive lens component, said zoom lens system being adapted to perform zooming operation by varying the airspace reserved between said front and rear lens groups and to satisfy the following conditions (1) through (9):

$$1.8 < r_1/|f_F| < 3.5 \tag{1}$$

$$6 < r_3/|f_F| < 9 \tag{2}$$

$$0.03 < 1/n_1 - (1/n_2 + 1/n_3)/2 \tag{3}$$

$$1.75 < n_7 \tag{4}$$

$$50 < (\nu_2 + \nu_3)/2 \tag{5}$$

$$0.18 < (d_3 + d_4 + d_5)/|f_F| < 0.3 \tag{6}$$

$$1.68 < n_4 \tag{7}$$

$$3 < |r_8|/|f_F| \tag{8}$$

$$0.35 < (d_9 + d_{13})/f_R < 0.5 \tag{9}$$

wherein the reference symbol $r_1$ represents radius of curvature on the object side surface of said first lens component, the reference symbol $r_3$ represents radius of curvature on the object side surface of said second lens component, the reference symbols $n_1$, $n_2$, $n_3$, and $n_7$ represent refractive indices of said first, second, third and seventh lens components respectively, the reference symbols $\nu_2$ and $\nu_3$ represent Abbe's numbers of said second and third lens components respectively, the reference symbols $d_3$ and $d_5$ represent thickness of said second and third lens component respectively, the reference symbol $d_4$ represents the airspace reserved between said second and third lens components, the reference symbol $n_4$ represents refractive index of said fourth lens component, the reference symbol $r_8$ represents radius of curvature on the image side surface of said fourth lens component, the reference symbols $d_9$ and $d_{13}$ represent thicknesses of said fifth and seventh lens components respectively, the reference symbol $f_F$ represents focal length of said front lens group, and the reference symbol $f_R$ represents focal length of said rear lens group.

2. A zoom lens system according to claim 1 satisfying furthermore the following additional conditions (10) and (11):

$$0.88 < |r_{16}|/f_R < 1.2$$

$$1.6 < (n_5 + n_6 + n_8)/3 < 1.7$$

wherein the reference symbol $r_{16}$ represents radius of curvature on the image side surface of said eighth lens component, and the reference symbols $n_5$, $n_6$ and $n_8$ represent refractive indices of said fifth, sixth and eighth lens components respectively.

3. A zoom lens system comprising a front lens group consisting of a first positive lens component, a second negative meniscus lens component having a convex surface on the image side, a third negative lens component, and fourth positive lens component, and a rear lens group consisting of a fifth positive lens component, a sixth positive lens component, a seventh negative lens component and an eighth positive lens component, said zoom lens system being adapted to perform zooming operation by varying the airspace reserved between said front and rear lens groups and to satisfy the following conditions (1) through (6):

$$1.8 < r_1/|f_F| < 3.5 \tag{1}$$

$$6 < r_3/|f_F| < 9 \tag{2}$$

$$0.03 < 1/n_1 - (1/n_2 + 1/n_3)/2 \tag{3}$$

$$1.75 < n_7 \tag{4}$$

$$50 < (\nu_2 + \nu_3)/2 \tag{5}$$

$$0.18 < (d_3 + d_4 + d_5)/|f_F| < 0.3 \tag{6}$$

wherein the reference symbol $r_1$ represents radius of curvature on the object side surface of said first lens component, the reference symbol $r_3$ represents radius of curvature on the object side surface of said second lens component, the reference symbols $n_1$, $n_2$, $n_3$ and $n_7$ represent refractive indices of said first, second, third and seventh lens components respectively, the reference symbols $\nu_2$ and $\nu_3$ represent Abbe's numbers of said second and third lens components respectively, the reference symbols $d_3$ and $d_5$ represent thickness of said second and third lens component respectively, the reference symbol $d_4$ represents the airspace reserved between said second and third lens components, and the reference symbol $f_F$ represents focal length of said front lens group, and having the following numerical data:

| | | |
|---|---|---|
| $r_1 = 137.314$ | | |
| $d_1 = 3.86$ | $n_1 = 1.48749$ | $\nu_1 = 70.15$ |
| $r_2 = -222.000$ | | |
| $d_2 = 0.1$ | | |
| $r_3 = 311.605$ | | |
| $d_3 = 1.25$ | $n_2 = 1.691$ | $\nu_2 = 54.84$ |
| $r_4 = 18.385$ | | |
| $d_4 = 8.57$ | | |
| $r_5 = -67.036$ | | |
| $d_5 = 1.65$ | $n_3 = 1.691$ | $\nu_3 = 54.84$ |
| $r_6 = 65.522$ | | |
| $d_6 = 1.12$ | | |
| $r_7 = 39.146$ | | |
| $d_7 = 5.1$ | $n_4 = 1.79952$ | $\nu_4 = 42.24$ |
| $r_8 = -175.987$ | | |
| $d_8 = 0.4 \sim 23.43$ | | |
| $r_9 = 46.836$ | | |
| $d_9 = 6.87$ | $n_5 = 1.62299$ | $\nu_5 = 58.14$ |
| $r_{10} = -71.855$ | | |
| $d_{10} = 0.1$ | | |
| $r_{11} = 19.837$ | | |
| $d_{11} = 3.14$ | $n_6 = 1.62299$ | $\nu_6 = 58.14$ |
| $r_{12} = 46.162$ | | |
| $d_{12} = 4.31$ | | |
| $r_{13} = -77.407$ | | |
| $d_{13} = 6.94$ | $n_7 = 1.78472$ | $\nu_7 = 25.7$ |
| $r_{14} = 19.549$ | | |
| $d_{14} = 1.00$ | | |
| $r_{15} = 52.302$ | | |
| $d_{15} = 3.23$ | $n_8 = 1.72342$ | $\nu_8 = 38.03$ |
| $r_{16} = -33.197$ | | |
| $f = 28.09 \sim 47.5$, | $\omega = 37.6° \sim 24.4°$ | |
| $f_F = -46.498$, | $f_R = 34.168$ | |
| $r_1/|f_F| = 2.95$, | $r_3/|f_F| = 6.7$ | |

-continued $$\frac{1}{n_1} - \left(\frac{1}{n_2} + \frac{1}{n_3}\right)/2 = 0.0809$$

| | |
|---|---|
| $(\nu_2 + \nu_3)/2 = 54.84$, | $(d_3 + d_4 + d_5)/|f_F| = 0.247$ |
| $|r_8|/|f_F| = 3.785$, | $(d_9 + d_{13})/f_R = 0.404$ |
| $|r_{16}|/f_R = 0.972$, | $(n_5 + n_6 + n_8)/3 = 1.65647$ | wherein the reference symbols $r_1$ through $r_{16}$ represent radii of curvature on the surface of the respective lens components, the reference symbols $d_1$ through $d_{15}$ represent thicknesses of the respective lens components and airspaces reserved therebetween, the reference symbols $n_1$ through $n_8$ represent refractive indices of the respective lens components, the reference symbols $\nu_1$ through $\nu_8$ represent Abbe's numbers of the respective lens components, the reference symbol f represents focal length of said zoom lens system as a whole, and the reference symbol $\omega$ represents half field angle.

4. A zoom lens system comprising a front lens group consisting of a first positive lens component, a second negative meniscus lens component having a convex surface on the image side, a third negative lens component, and fourth positive lens component, and a rear lens group consisting of a fifth positive lens component, a sixth positive lens component, a seventh negative lens component and an eighth positive lens component, said zoom lens system being adapted to perform zooming operation by varying the airspace reserved between said front and rear lens groups and to satisfy the following conditions (1) through (6):

$$1.8 < r_1/|f_F| < 3.5 \tag{1}$$

$$6 < r_3/|f_F| < 9 \tag{2}$$

$$0.03 < 1/n_1 - (1/n_2 + 1/n_3)/2 \tag{3}$$

$$1.75 < n_7 \tag{4}$$

$$50 < (\nu_2 + \nu_3)/2 \tag{5}$$

$$0.18 < (d_3 + d_4 + d_5)/|f_F| < 0.3 \tag{6}$$

wherein the reference symbol $r_1$ represents radius of curvature on the object side surface of said first lens component, the reference symbol $r_3$ represents radius of curvature on the object side surface of said second lens component, the reference symbols $n_1$, $n_2$, $n_3$ and $n_7$ represent refractive indices of said first, second, third and seventh lens components respectively, the reference symbols $\nu_2$ and $\nu_3$ represent Abbe's numbers of said second and third lens components respectively, the reference symbols $d_3$ and $d_5$ represent thickness of said second and third lens component respectively, the reference symbol $d_4$ represents the airspace reserved between said second and third lens components, and the reference symbol $f_F$ represents focal length of said front lens group, and having the following numerical data:

| | | |
|---|---|---|
| $r_1 = 134.898$ | | |
| $d_1 = 3.89$ | $n_1 = 1.49831$ | $\nu_1 = 65.03$ |
| $r_2 = -233.499$ | | |
| $d_2 = 0.1$ | | |
| $r_3 = 377.021$ | | |
| $d_3 = 1.25$ | $n_2 = 1.6968$ | $\nu_2 = 55.52$ |
| $r_4 = 19.288$ | | |

-continued

| | | |
|---|---|---|
| $d_4 = 8.76$ | | |
| $r_5 = -97.151$ | | |
| $d_5 = 1.64$ | $n_3 = 1.6968$ | $\nu_3 = 55.52$ |
| $r_6 = 53.184$ | | |
| $d_6 = 1.54$ | | |
| $r_7 = 37.855$ | | |
| $d_7 = 5.05$ | $n_4 = 1.8061$ | $\nu_4 = 40.95$ |
| $r_8 = -366.117$ | | |
| $d_8 = 0.37 \sim 23.4$ | | |
| $r_9 = 41.265$ | | |
| $d_9 = 5.98$ | $n_5 = 1.62041$ | $\nu_5 = 60.27$ |
| $r_{10} = -76.125$ | | |
| $d_{10} = 0.1$ | | |
| $r_{11} = 20.625$ | | |
| $d_{11} = 2.87$ | $n_6 = 1.62041$ | $\nu_6 = 60.27$ |
| $r_{12} = 53.136$ | | |
| $d_{12} = 4.31$ | | |
| $r_{13} = -67.244$ | | |
| $d_{13} = 6.85$ | $n_7 = 1.7847$ | $\nu_7 = 26.22$ |
| $r_{14} = 19.866$ | | |
| $d_{14} = 1.28$ | | |
| $r_{15} = 67.611$ | | |
| $d_{15} = 3.35$ | $n_8 = 1.72342$ | $\nu_8 = 38.03$ |
| $r_{16} = -30.241$ | | |

-continued

| | |
|---|---|
| $f = 28.09 \sim 47.5$, | $\omega = 37.6° \sim 24.4°$ |
| $f_F = -46.498$, | $f_R = 34.168$ |
| $r_1/|f_F| = 2.901$, | $r_3/|f_F| = 8.108$ |

$$\frac{1}{n_1} - \left(\frac{1}{n_2} + \frac{1}{n_3}\right)/2 = 0.0781$$

| | |
|---|---|
| $(\nu_2 + \nu_3)/2 = 55.52$, | $(d_3 + d_4 + d_5)/|f_F| = 0.250$ |
| $|r_8|/|f_F| = 7.874$, | $(d_9 + d_{13})/f_R = 0.375$ |
| $|r_{16}|/f_R = 0.885$, | $(n_5 + n_6 + n_8)/3 = 1.65475$ | wherein the reference symbols $r_1$ through $r_{16}$ represent radii of curvature on the surface of the respective lens components, the reference symbols $d_1$ through $d_{15}$ represent thicknesses of the respective lens components and airspaces reserved therebetween, the reference symbols $n_1$ through $n_8$ represent refractive indices of the respective lens components, the reference symbols $\nu_1$ through $\nu_8$ represent Abbe's numbers of the respective lens components, the reference symbol f represents focal length of said zoom lens system as a whole, and the reference symbol $\omega$ represents half field angle.

* * * * *